United States Patent Office 2,739,918
Patented Mar. 27, 1956

2,739,918
METHOD OF BONDING TEXTILE FIBERS TO RUBBER

James William Illingworth, Sutton Coldfield, England, assignor to Dunlop Tire and Rubber Corporation, Buffalo, N. Y., a corporation of New York No Drawing. Application January 26, 1954,
Serial No. 406,366

12 Claims. (Cl. 154—92)

My invention relates to the impregnation of textile materials.

In the production of rubber articles containing textile layers it is known to impregnate the textile with a rubber latex containing in solution a phenolic resin, such as a resorcinol-formaldehyde resin, in order to improve the adhesion of the rubber to the textile material. When the textile is in the form of cord, as used in the manufacture of pneumatic tyres, the impregnation is carried out by dipping the cord but it has been found that the dip is confined to the surface of the cord and does not penetrate appreciably between the foldings. Attempts have been made to improve the penetration by dipping the textile while in the form of yarn but the resulting yarn has been found to be so stiff that it is not possible to make a good cord therefrom.

My invention avoids the above difficulties and provides a textile cord which is more effectively impregnated with phenolic resin.

According to my invention a method of manufacturing textile cord impregnated with a phenolaldehyde resin comprises treating a textile cord containing a phenol with an aldehyde to form phenolaldehyde resin in situ.

My invention also includes a process for the manufacture of composite products of rubber and textile cord which comprises applying a vulcanizable rubber composition to an assemblage of cords so produced and vulcanizing the structure thus formed.

The phenol is preferably applied to the yarn at any convenient time prior to making up into cord; for example, it can be applied at the time of application of the finishing agent by incorporation therewith or an aqueous solution of the phenol can be used as a separate bath. Alternatively, in the case of artificial fibres, the phenol can be incorporated in the yarn by including it in the spinning solution. The aldehyde can be applied to the treated yarn, either as an aqueous solution or as a vapour, and preferably under alkaline conditions, at any convenient time after making up into cord. If desired, the aldehyde can be applied from a treating bath which also contains rubber latex. The aldehyde penetrates between the foldings of the cord to a far greater extent than can be obtained by dipping the cord in rubber latex containing phenolic resin in solution and, since the yarn has been impregnated with phenol, a phenol-aldehyde resin is formed in situ. The presence of the phenol-aldehyde resin throughout the cord gives greater adhesion of rubber to the cord and, although this improved adhesion can only be measured accurately by static methods, it is apparent that the dynamic adhesion will also be greatly improved.

The proportion of the reactants and the processing conditions are preferably chosen so that a thermosetting resin is formed in an amount not greater than 5% on the weight of the cord and preferably not exceeding 2%.

The phenol is preferably a polyhydric phenol, especially a phenol in which the hydroxyl groups are in meta relationship in the benzene nucleus. A particularly suitable phenol is resorcinol. A preferred aldehyde is formaldehyde.

The process can be applied to various textile yarns including nylon, rayon and cotton. Cords prepared from such yarns in accordance with the invention may be made up into a weftless cord fabric and vulcanizable rubber compound is then applied thereto by calendering. The rubber layer is then vulcanized by heating. The resulting coated fabric is particularly valuable for the construction of pneumatic tyre covers and other goods in which a strong adhesion of the rubber to the cords is desired.

The invention is illustrated by the following example in which all parts are given by weight:

Example

Resorcinol was incorporated in a finishing bath of the conventional type used for treatment of viscose yarn. The concentration of the resorcinol and the period of immersion of the yarn were adjusted so that the yarn after drying in the usual manner contained 1 per cent of resorcinol. The treated yarn was then doubled to form a 2/1650 denier cord and passed through a bath containing 40 per cent of formaldehyde and 1 per cent of caustic soda. The treated cord was heated in an oven for 30 minutes at 100° C. in order to dry the cord and to ensure that the resorcinol-formaldehyde resin formed in the cord was fully condensed. The cord was made up into a weftless fabric, coated with a layer of vulcanisable rubber compound by calendering and vulcanized in the usual manner.

In order to test the improvement in adhesion of the rubber to the treated cord a slab of rubber was moulded with treated and untreated cords immersed in the surface to a depth of half the diameter of the cord and then vulcanized. Measurements were then made of the adhesion between the cords and the rubber by determining the force required to pull the individual cords out of the slab when doubled back through an angle of 180°. It was found that the cords treated in the manner described above exhibited at least double the adhesion of the untreated cords.

Having described my invention, what I claim is:

1. A method of manufacturing flexible textile cord impregnated with a phenol-aldehyde resin which comprises treating a textile cord of assembled fibres containing a phenol distributed within said cord with an aldehyde to form a phenol-aldehyde resin in situ.

2. The method of claim 1 in which said resin does not exceed 5% by weight of said cord.

3. A method of manufacturing flexible textile cord impregnated with a phenol-aldehyde resin which comprises impregnating a textile yarn with a phenol, forming the yarn into a cord and treating the cord with an aldehyde to form a phenol-aldehyde resin in situ.

4. A method according to claim 3 wherein the said resin is formed by treating the cord with an alkaline aqueous solution of the aldehyde.

5. A method according to claim 3 wherein the said phenol is a polyhydric phenol.

6. A method according to claim 5 wherein the polyhydric phenol contains hydroxyl groups in meta relationship in the benzene nucleus.

7. A method according to claim 3 wherein the said aldehyde is formaldehyde.

8. A method according to claim 3 wherein the cord comprises artificial fibres.

9. A method according to claim 8 wherein the cord comprises viscose fibres.

10. A method of manufacturing composite products of rubber and textile cord which comprises impregnating a textile yarn with a phenol, forming the yarn into a cord, treating the cord with an aldehyde to form a phenol-aldehyde resin in situ, assembling a number of said cords in parallel relation substantially in contact, applying a vulcanizable rubber composition to said assembled cords and vulcanizing the structure so formed.

11. A method of manufacturing flexible textile cord impregnated with a phenol-aldehyde resin which comprises immersing a yarn in a finishing bath containing resorcinol in amount sufficient to deposit substantially 1% by weight on said yarn after drying, removing and drying said yarn, forming said yarn into a cord, passing said cord through a bath containing 40% of formaldehyde and 1% of caustic soda, removing said yarn from said bath and heating it for 30 minutes at 130° C.

12. A method of manufacturing flexible textile cord impregnated with a phenol-aldehyde resin which comprises immersing a yarn in a finishing bath containing a phenol, removing and drying said yarn, forming said yarn into a cord, passing said cord through a bath containing formaldehyde and caustic soda, removing said yarn from said bath and heating it for 30 minutes at 130° C.

References Cited in the file of this patent

UNITED STATES PATENTS

| | | |
|---|---|---|
| 2,291,208 | Brown et al. | July 28, 1942 |
| 2,314,997 | Lessig et al. | Mar. 30, 1943 |
| 2,518,144 | Illingworth et al. | Aug. 8, 1950 |
| 2,594,210 | Potter et al. | Apr. 22, 1952 |

FOREIGN PATENTS

| | | |
|---|---|---|
| 570,182 | Great Britain | June 26, 1945 |